United States Patent
Deng (10) Patent No.: US 12,174,521 B2
(45) Date of Patent: Dec. 24, 2024

(54) PROJECTION DEVICE AND USE METHOD THEREOF

(71) Applicant: Coretronic Corporation, Hsin-Chu (TW)

(72) Inventor: Yu-Hsiang Deng, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 218 days.

(21) Appl. No.: 17/863,411

(22) Filed: Jul. 13, 2022

(65) Prior Publication Data
US 2023/0019229 A1    Jan. 19, 2023

(30) Foreign Application Priority Data
Jul. 14, 2021 (CN) .......................... 202110793211.5

(51) Int. Cl.
*G03B 21/20* (2006.01)
*G02B 27/10* (2006.01)
*G02B 27/30* (2006.01)
*G03B 33/08* (2006.01)

(52) U.S. Cl.
CPC ....... *G03B 21/204* (2013.01); *G02B 27/1006* (2013.01); *G02B 27/30* (2013.01); *G03B 21/2013* (2013.01); *G03B 21/206* (2013.01); *G03B 33/08* (2013.01)

(58) Field of Classification Search
CPC ............... G03B 21/204; G03B 21/2013; G03B 21/206; G03B 33/08; G03B 21/005; G02B 27/1006; G02B 27/30; G02B 27/146; G02B 27/141; G02F 1/15; G02F 1/163
See application file for complete search history.

(56) References Cited

U.S. PATENT DOCUMENTS

| | | | | |
|---|---|---|---|---|
| 2018/0227554 | A1* | 8/2018 | Li | ........................ H04N 9/317 |
| 2019/0346752 | A1* | 11/2019 | Pan | ....................... G03B 21/204 |
| 2020/0050093 | A1* | 2/2020 | Liao | ...................... G03B 33/08 |
| 2020/0314396 | A1* | 10/2020 | Fan | ...................... H04N 9/3152 |

FOREIGN PATENT DOCUMENTS

| | | | |
|---|---|---|---|
| CN | 106681087 | 5/2017 | |
| CN | 107644897 | 1/2018 | |
| CN | 115145103 | 10/2022 | |
| EP | 3521902 A1 * | 8/2019 | ......... G02B 26/0833 |

* cited by examiner

*Primary Examiner* — Magda Cruz
(74) *Attorney, Agent, or Firm* — JCIPRNET (57) ABSTRACT

A projection device, including an illumination light source, an electrochromic module, at least one light valve, and a projection lens, is provided. The illumination light source provides an illumination beam. The electrochromic module is disposed on a transmission path of the illumination beam. The electrochromic module includes at least one electrochromic element, and sequentially maintains or filters the illumination beam to provide a plurality of color beams. The at least one light valve is disposed on the transmission path of the color beams transmitted by the electrochromic module to convert each of the color beam into an image beam. The projection lens is disposed on a transmission path of the image beam to project the image beam out of the projection device. The projection device and the use method thereof provided by the disclosure may filter the color light output or the color space of a display image.

18 Claims, 9 Drawing Sheets

PROJECTION DEVICE AND USE METHOD THEREOF

CROSS-REFERENCE TO RELATED APPLICATION

This application claims the priority benefit of China application serial no. 202110793211.5, filed on Jul. 14, 2021. The entirety of the above-mentioned patent application is hereby incorporated by reference herein and made a part of this specification.

BACKGROUND

Technical Field

The disclosure relates to an optical device and a use method thereof, and more particularly to a projection device and a use method thereof.

Description of Related Art

The projection device is a display device for generating a large-size image. With the evolution and innovation of technology, the projection device has been continuously improving. The imaging principle of the projection device is to convert an illumination beam generated by an illumination light source into an image beam by using a light valve, and then project the image beam onto a projection target (for example, a screen or a wall) through a projection lens to form a projection image.

The projection device includes a light combining module, a wavelength conversion element, a light homogenizing element, an illumination light source, a projection lens, a light valve, and other components. Taking a single light valve as an example, the wavelength conversion element is a conventional combination of a phosphor wheel and a filter element. Therefore, the innate color light output (CLO) and color space size and characteristic of the display image projected by the projection device depend on the beam wavelength provided by the illumination light source and the wavelength conversion element in the projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection device and a use method thereof, which may change the color light output or the color space of a display image.

The other objectives and advantages of the disclosure may be further understood from the technical features disclosed in the disclosure.

In order to achieve one, a part, or all of the above objectives or other objectives, the disclosure provides a projection device, which includes an illumination light source, an electrochromic module, at least one light valve, and a projection lens. The illumination light source is configured to provide an illumination beam. The electrochromic module is disposed on a transmission path of the illumination beam. The electrochromic module includes at least one electrochromic element, and is configured to sequentially maintain or filter the illumination beam to provide a plurality of color beams. The at least one light valve is disposed on the transmission path of the color beams transmitted by the electrochromic module, and is configured to convert each of the color beams into an image beam. The projection lens is disposed on a transmission path of the image beam, and is configured to project the image beam out of the projection device.

In order to achieve one, a part, or all of the above objectives or other objectives, the disclosure also provides a use method of a projection device. The projection device includes an illumination light source, an electrochromic module, a control element, at least one light valve, and a projection lens. The use method of the projection device includes the following steps. The illumination light source provides an illumination beam to the electrochromic module. The control element receives a first signal or a second signal. The control element drives the electrochromic module according to the first signal or stops driving the electrochromic module according to the second signal. Each of color beams that has passed through the electrochromic module is transmitted to the at least one light valve, and an image beam is projected from the projection lens. The electrochromic module includes at least one electrochromic element, and sequentially maintain or filter the illumination beam to provide the plurality of color beams.

Based on the above, the embodiments of the disclosure have at least one of the following advantages or effects. In the projection device and the use method thereof of the disclosure, the electrochromic module is disposed on the transmission path of the illumination beam, and the light valve is disposed on the transmission path of the color beams transmitted by the electrochromic module. Therefore, the projection device may sequentially modulate the wavelength range of the color beams when entering the light valve by using the electrochromic module. In this way, different projection modes and color spaces may be switched without changing the illumination light source to reduce the loss of light emitting intensity or the configuration of the filter element may be omitted to reduce the heat energy of the illumination light source and the noise generated by the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top." "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including." "comprising." or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing." "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
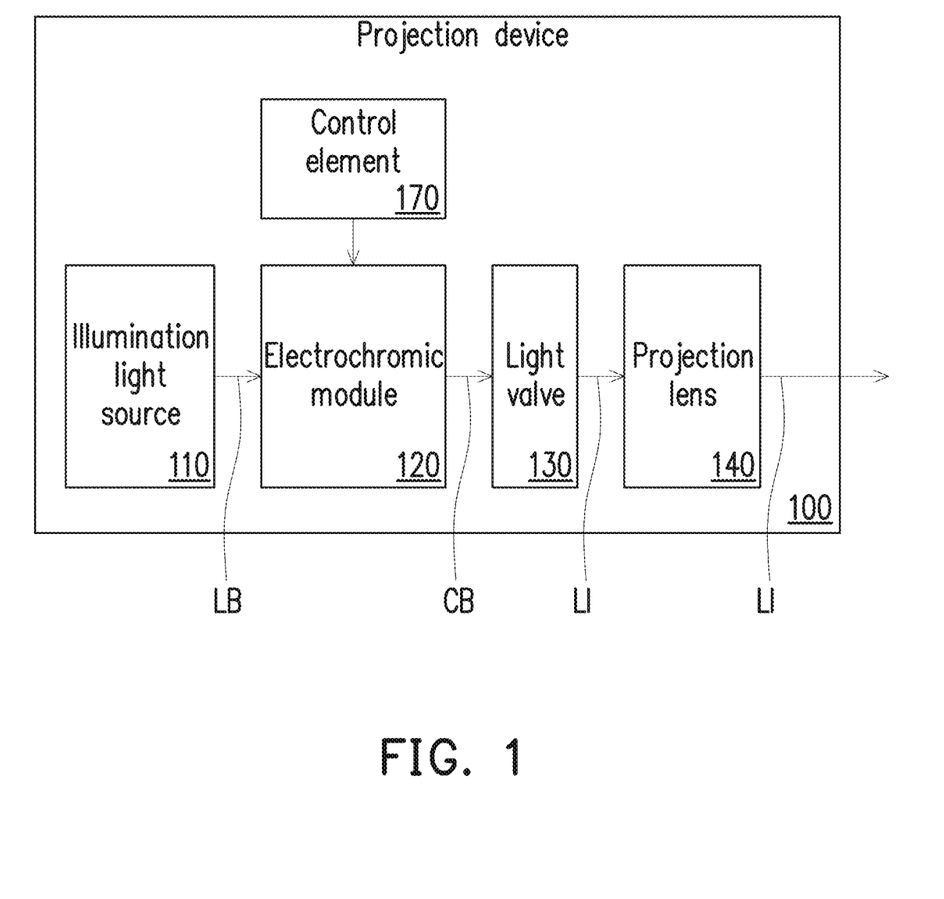
FIG. 1 is a schematic diagram of a projection device according to an embodiment of the disclosure.

FIG. 1 is a schematic diagram of a projection device according to an embodiment of the disclosure. Please refer to FIG. 1. The embodiment provides a projection device 100, which includes an illumination light source 110, an electrochromic module 120, at least one light valve 130, a projection lens 140, and a control element 170. The illumination light source 110 is configured to provide an illumination beam LB. The electrochromic module 120 is disposed on a transmission path of the illumination beam LB and is disposed between the illumination light source 110 and the at least one light valve 130. The control element 170 is electrically connected and configured to drive the electrochromic module 120. The control element 170 is, for example, a controller. The at least one light valve 130 is disposed on the transmission path of color beams CB that has passed through the electrochromic module 120 and is configured to convert the color beams CB into an image beam LI. The projection lens 140 is disposed on a transmission path of the image beam LI and is configured to project the image beam LI out of the projection device 100 onto a projection target (not shown), such as a screen or a wall.

Figure 2:
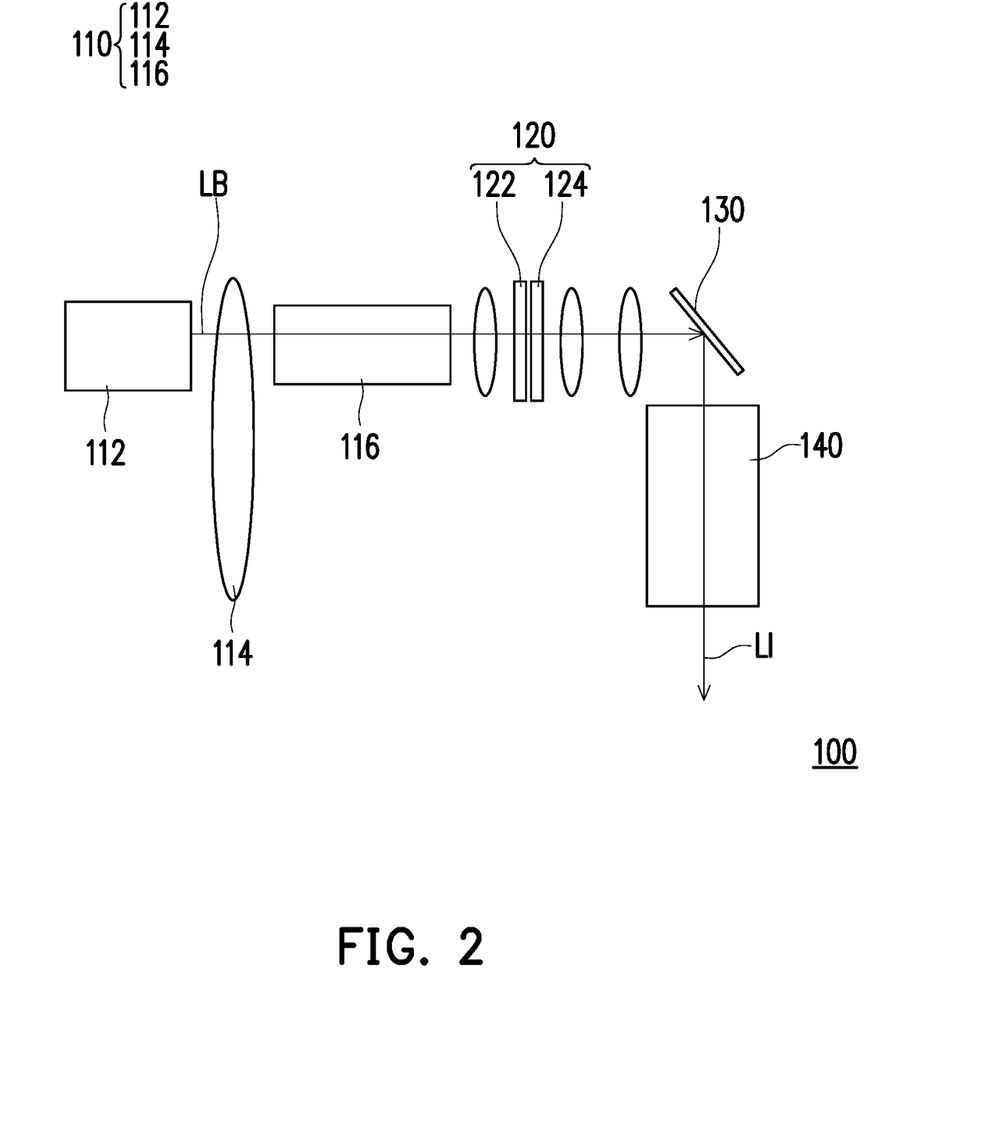
FIG. 2 is a schematic diagram of a projection device according to another embodiment of the disclosure.

FIG. 2 is a schematic diagram of a projection device according to another embodiment of the disclosure. Please refer to FIG. 2. The illumination light source 110 is configured to provide the illumination beam LB. The illumination light source 110 is, for example, composed of a light emitting element 112, a filter element 114, a light homogenizing element 116, a wavelength conversion element (not shown in the figure), and multiple light splitting/combining elements (not shown in the figure) and is configured to provide light with different wavelengths as a source of illumination light. In the embodiment, the illumination light source 110 is configured to sequentially provide the illumination beams LB with different wavelengths. However, the disclosure does not limit the type or form of the illumination light source 110 in the projection device 100. The detailed structure and implementation manner of the illumination light source 110 may be obtained from the common knowledge in the art with sufficient teaching, suggestion, and implementation description, so there will be no repetition.

The electrochromic module 120 is disposed on the transmission path of the illumination beam LB and is configured to sequentially maintain or filter the illumination beam LB to provide the plurality of color beams CB. The electrochromic module 120 includes at least one electrochromic element. The electrochromic element includes thiophene materials, such as dioxythiophene whose oxidation state may be transparent and colorless, and the reduction state may be formed by adding different groups of dioxythiophene to form reduction states with different colors. Therefore, according to the principle of color superposition, multiple layers added with different groups of dioxythiophene may be superimposed, so that the electrochromic element may filter out color light with various colors.

For example, in the embodiment, the electrochromic module 120 includes a first electrochromic element 122 and a second electrochromic element 124. The oxidation state of the first electrochromic element 122 is transparent and colorless, and the reduction state of the first electrochromic element 122 allows a green beam to pass through. The oxidation state of the second electrochromic element 124 is transparent and colorless, and the reduction state of the second electrochromic element 124 allows a red beam to pass through. Therefore, the illumination beam LB provided by the illumination light source 110 may be modulated by using the electrochromic module 120 to allow light beam with a specific wavelength range to pass through, so as to achieve the selection of a color light. Furthermore, in some embodiments, the control element 170 (shown in FIG. 1) may be electrically connected to the electrochromic module 120 to control the first electrochromic element 122 and the second electrochromic element 124 to switch between the oxidation state and the reduction state. The detailed technical content will be explained in subsequent paragraphs. The detailed operation and implementation manner of electrochromism may be obtained from the common knowledge in the art with sufficient teaching, suggestion and implementation description, so there will be no repetition.

The light valve 130 is disposed on the transmission path of the plurality of color beams CB provided by the electrochromic module 120, and is configured to sequentially convert the plurality of color beams CB into the image beams LI. The light valve 130 is, for example, a reflective optical modulator such as a liquid crystal on silicon panel (LCoS panel) and a digital micro-mirror device (DMD). In some embodiments, the light valve 130 may also be a transmissive optical modulator such as a transparent liquid crystal panel, an electro-optical modulator, a magneto-optical modulator, or an acousto-optical modulator (AOM). The disclosure does not limit the form and type of the light valve 130. The detailed steps and implementation manner of the method for converting the color beams CB into the image beams LI by the light valve 130 may be obtained from the common knowledge in the art with sufficient teaching, suggestion, and implementation description, so there will be no repetition. In the embodiment, the number of the light valve 130 is one. For example, the projection device 100 uses a single DMD. However, in other embodiments, there may be more than one, and the disclosure is not limited thereto.

The projection lens 140 is disposed on the transmission path of the image beams LI, and is configured to project the image beams LI out of the projection device 100. The projection lens 140 includes, for example, a combination of one or more optical lens elements with refractive power, such as various combinations of non-planar lens elements including biconcave lens elements, biconvex lens elements, concave-convex lens elements, convex-concave lens elements, plano-convex lens elements, and plano-concave lens elements. In an embodiment, the projection lens 140 may further include a planar optical lens element to project the image beams LI from the light valve 130 onto the projection target in a reflective manner. The disclosure does not limit the form and type of the projection lens 140.

Figure 3A:
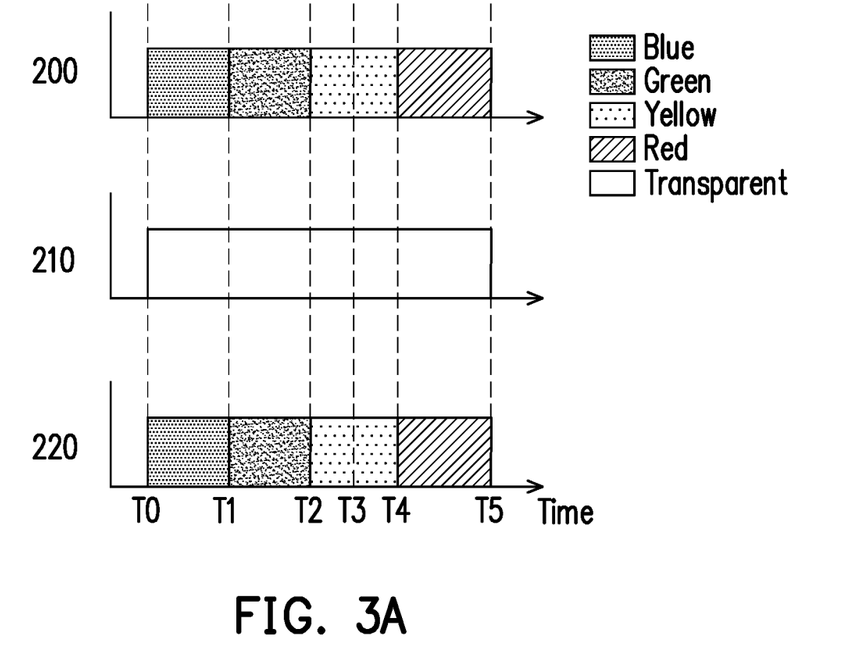
FIG. 3A and FIG. 3B are respectively schematic diagrams of light source colors of the projection device of FIG. 2 in different time sequences according to an embodiment.
Figure 3B:
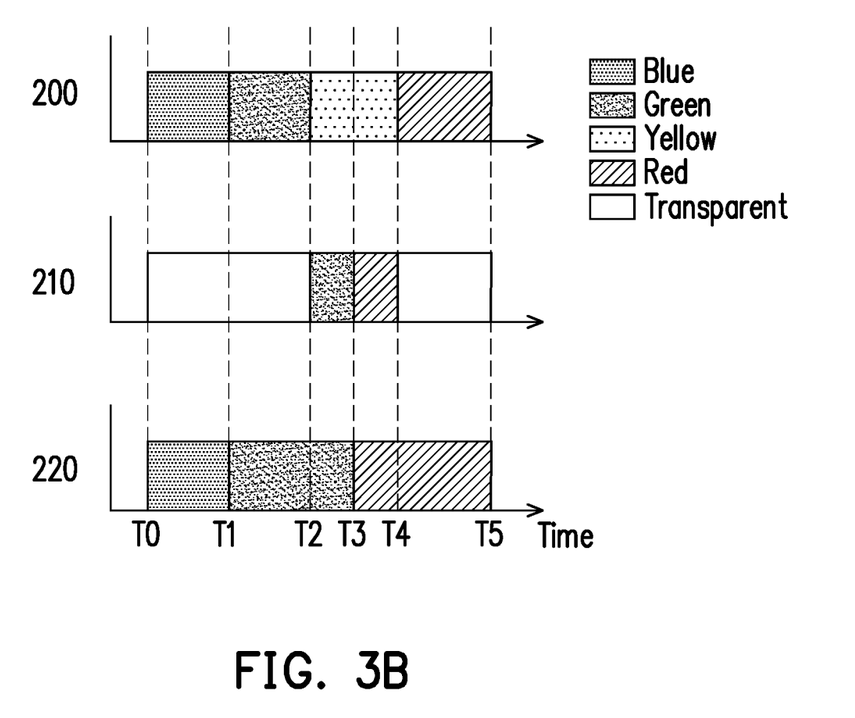

FIG. 3A and FIG. 3B are respectively schematic diagrams of light source colors of the projection device of FIG. 2 in different time sequences according to an embodiment. Please refer to FIG. 2, FIG. 3A, and FIG. 3B. The light source colors in different time sequences shown in FIG. 3A and FIG. 3B may be applied to at least the projection device 100 shown in FIG. 2, so the following paragraphs are exemplified by the projection device 100 shown in FIG. 2. As shown in FIG. 3A, a graph 200 represents colors of the illumination beams LB provided by the illumination light source 110 according to the time sequence. In the time sequence from a time T0 to a time T5, the illumination light source 110 sequentially provides blue, green, yellow, and red illumination beams LB. A graph 210 represents the color of the electrochromic module 120 that may allow beams to pass through. A graph 220 represents colors of the color beams CB after passing through the electrochromic module 120 (or the colors of the color beams CB transmitted to the light valve 130). In the embodiment, the projection device 100 may be activated to a high-brightness mode to modulate the electrochromic module 120 to be transparent and colorless, so that the illumination beams LB with various colors may all pass through the electrochromic module 120. Specifically, the first electrochromic element 122 and the second electrochromic element 124 are both modulated to a transparent state via the control element 170 (shown in FIG. 1). The illumination beams LB with various colors may all pass through the first electrochromic element 122 and the second electrochromic element 124 to form the color beams CB. The color beams CB are transmitted to the light valve 130, so that the brightness of the projection image does not decrease.

In addition, as shown in FIG. 3B, the projection device 100 may also be switched to a general mode, such as an sRGB color space, which is configured to improve the color saturation. In detail, in the time sequence from time the T0 to a time T1, the illumination light source 110 provides the blue illumination beam, and the electrochromic module 120 is modulated to be transparent and colorless. Specifically, the first electrochromic element 122 and the second electrochromic element 124 are both modulated to the transparent state via the control element 170 (shown in FIG. 1). Therefore, in the time sequence from the time T0 to the time T1, the light valve 130 receives the blue color beam CB. In the time sequence from the time T1 to a time T2, the illumination light source 110 provides the green illumination beam, and the electrochromic module 120 is modulated to be transparent and colorless. Specifically, the first electrochromic element 122 and the second electrochromic element 124 both maintain the transparent state. Therefore, in the time sequence from the time T1 to the time T2, the light valve 130 receives the green color beam CB.

In the time sequence from the time T2 to a time T4, the illumination light source 110 provides the yellow illumination beam, and in the time sequence from the time T2 to a time T3, the electrochromic module 120 is modulated to filter the yellow beam to provide the green color beam CB. Specifically, in the time sequence from time the T2 to the time T3, the first electrochromic element 122 is modulated to switch to a state that only allows a green portion of the yellow illumination beam to pass through via the control element 170 (shown in FIG. 1) to provide the green color beam CB, and the second electrochromic element 124 is configured to maintain the transparent state, so as to allow the green color beam CB provided from the first electrochromic element 122 to pass through. The light valve 130 receives the green color beam CB. In the time sequence from the time T3 to the time T4, the electrochromic module 120 is modulated to filter the yellow illumination beam to provide the red color beam CB. Specifically, in the time sequence from the time T3 to the time T4, the first electrochromic element 122 is modulated to switch to the transparent state via the control element 170, and the second electrochromic element 124 is modulated to switch to a state that only allows the red portion of the yellow illumination beam to pass through via the control element 170, so the yellow illumination beam may be filtered into the red color beam. The light valve 130 receives the red color beam CB. In other words, the wavelength of a portion of the illumination beam LB allowed by the first electrochromic element 122 to pass through is different from the wavelength of a portion of the illumination beam LB allowed by the second electrochromic element 124 to pass through. The allowable wavelength range may be modulated by adjusting the voltages of the first electrochromic element 122 and the second electrochromic element 124 to change the degree of light transmission, so as to modulate to the desired filtering color, but the disclosure is not limited thereto. In addition, the operation times (that is, the times in the reduction states) of the first electrochromic element 122 and the second electrochromic element 124 do not overlap, and the electrochromic materials of the first electrochromic element 122 and the second electrochromic element 124 are different, but the disclosure is not limited thereto.

Finally, in the time sequence from the time T4 to the time T5, the illumination light source 110 provides the red illumination beam LB, and the electrochromic module 120 is modulated to be transparent and colorless. Specifically, the first electrochromic element 122 and the second electrochromic element 124 are both modulated to the transparent state via the control element 170 (shown in FIG. 1). Therefore, in the time sequence from the time T4 to the time T5, the light valve 130 receives the red color beam CB. In this way, the projection device 100 of the embodiment may sequentially modulate the illumination beam LB by using the electrochromic module 120 to sequentially provide the different color beams CB to enter the light valve 130, so that the yellow beam may be effectively used even in the general mode. The yellow beam is respectively filtered into the green color beam and the red color beam, which greatly improves the light emitting efficiency. The high-brightness mode and the general mode may be switched without changing the intensity of the illumination light source 110, so that the brightness of the general mode does not significantly drop due to the general mode not using the yellow beam. The projection device 100 in the disclosure may reduce the loss of light emitting intensity.

It is worth mentioning that referring to FIG. 2, in the embodiment, the projection device 100 further includes a collimation lens element 160, which is disposed between the illumination light source 110 and the electrochromic module 120, so that the electrochromic module 120 is disposed on a path where the illumination beam LB is transmitted in a collimated manner. Specifically, the collimation lens element 160 is disposed between the light homogenizing element 116 and the first electrochromic element 122. In this way, the color beams CB passing through the electrochromic module 120 does not gradually lose reliability due to overheating caused by speckle concentration, and color shift such as blue shift may also be avoided to more effectively master the stability of color.

Figure 4A:
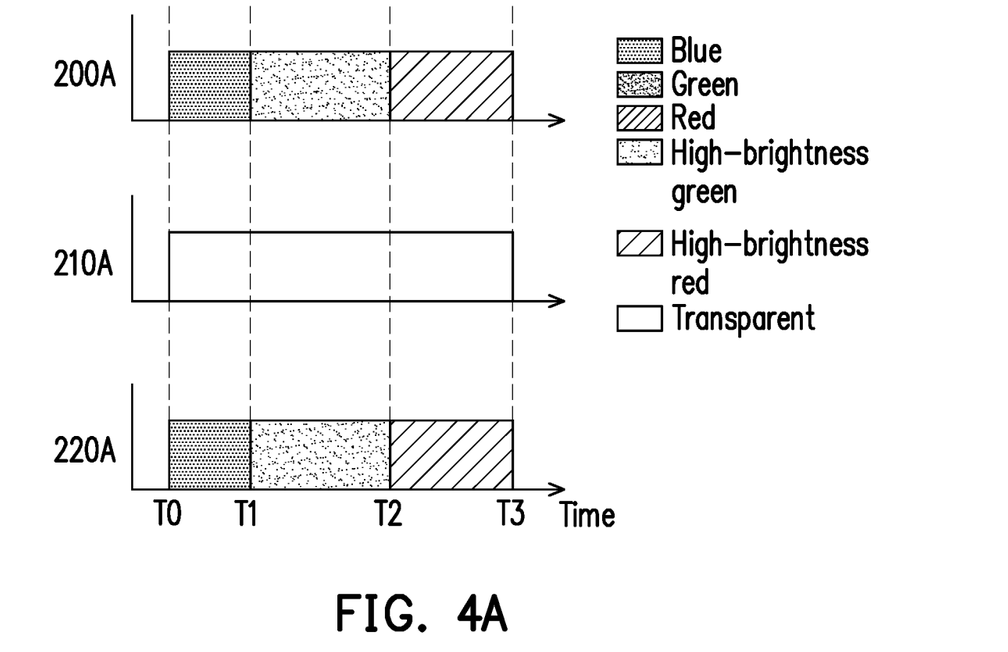
FIG. 4A and FIG. 4B are respectively schematic diagrams of light source colors of the projection device of FIG. 2 in different time sequences according to another embodiment.
Figure 4B:
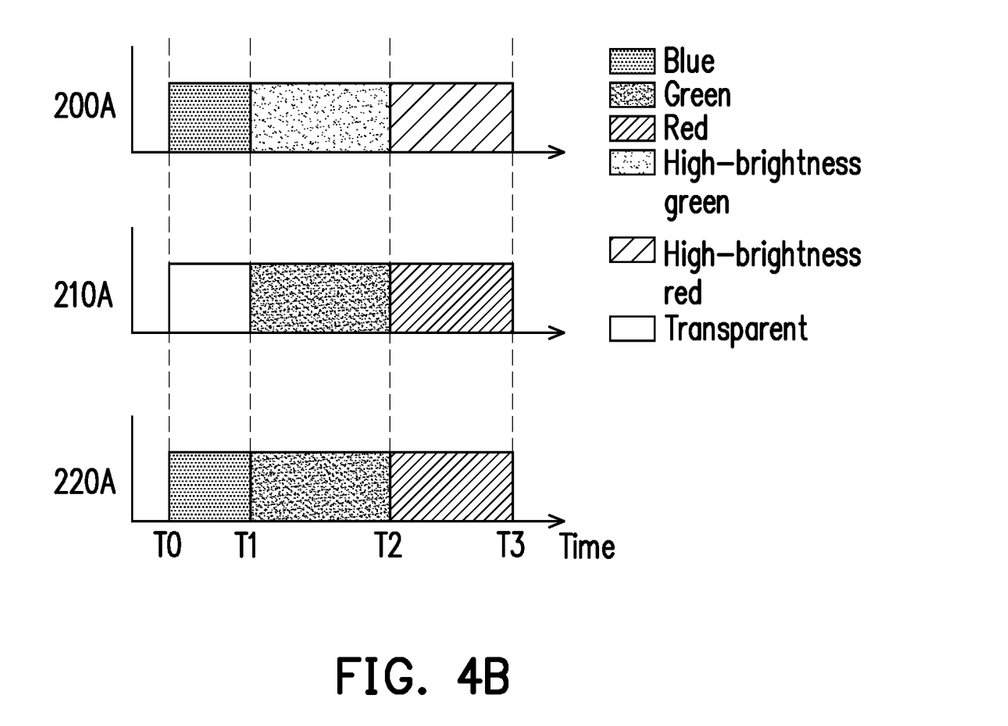

FIG. 4A and FIG. 4B are respectively schematic diagrams of light source colors of the projection device of FIG. 2 in different time sequences according to another embodiment. Please refer to FIG. 2, FIG. 4A, and FIG. 4B. Another type of light source colors in different time sequences shown in FIG. 4A and FIG. 4B may also be applied to at least the projection device 100 shown in FIG. 2, so the following paragraphs are exemplified by the projection device 100 shown in FIG. 2. As shown in FIG. 4A, a graph 200A represents the colors of the illumination beams LB provided by the illumination light source 110 according to the time sequence. In the time sequence from the time T0 to the time T3, the illumination light source 110 sequentially provides blue, high-brightness green, and high-brightness red illumination beams LB. A graph 210A represents the color of the electrochromic module 120 that may allow color beams to pass through. A graph 220A represents the colors of the color beams CB after passing through the electrochromic module 120 (or the colors of the color beams CB transmitted to the light valve 130). In the embodiment, the projection device 100 may be activated to a narrow color space mode. The illumination light source 110 is selected as narrow color space wavelength light, such as a Rec.709 color space. The electrochromic module 120 is modulated to be transparent and colorless, so that the illumination beams LB transmitted from the illumination light source 110 passes through the electrochromic module 120 to generate various color beams. Specifically, the first electrochromic element 122 and the second electrochromic element 124 are both modulated to the transparent state via the control element 170 (shown in FIG. 1), so that the illumination beams LB with various colors may pass through the first electrochromic element 122 and the second electrochromic element 124 to provide the color beams CB, the colors beams CB are transmitted to the light valve 130, and the brightness of a narrow color space projection image does not decrease.

In addition, as shown in FIG. 4B, the projection device 100 may also be switched to a wide color space mode to increase the color space, such as a DCI-P3 color space, but the disclosure is not limited thereto. In detail, in the time sequence from the time T0 to the time T1, the illumination light source 110 provides the blue illumination beam, and the electrochromic module 120 is modulated to be transparent and colorless. Specifically, the first electrochromic element 122 and the second electrochromic element 124 are both modulated to the transparent state via the control element 170 (shown in FIG. 1). Therefore, in the time sequence from the time T0 to the time T1, the light valve 130 receives the blue color beam CB.

In the time sequence from the time T1 to the time T2, the illumination light source 110 provides the high-brightness green illumination beam, and the electrochromic module 120 is modulated to wide color space green. Specifically, in the time sequence from the time T1 to the time T2, the first electrochromic element 122 is modulated to switch to a state that only allows a pure green portion of the high-brightness green illumination beam to pass through via the control element 170 (shown in FIG. 1) to provide the pure green color beam CB, and the second electrochromic element 124 is configured to maintain the transparent state to allow the green color beam transmitted from the first electrochromic element 122 to pass through, so the high-brightness green beam may be filtered into the pure green color beam by the electrochromic module 120. The light valve 130 receives the pure green color beam CB with a wide color space.

In the time sequence from the time T2 to the time T3, the illumination light source 110 provides the high-brightness red illumination beam, and the electrochromic module 120 is modulated to wide color space red. Specifically, in the time sequence from the time T2 to the time T3, the first electrochromic element 122 is modulated to switch to the transparent state via the control element 170 (shown in FIG. 1) to allow the high-brightness red illumination beam to pass through, and the second electrochromic element 124 is modulated to switch a state that only allows a pure red color portion of the high-brightness red illumination beam to pass through via the control element 170 to provide the pure red color beam, so the light valve 130 receives the pure red color beam CB with a wide color space.

In other words, the same as the embodiment of FIG. 3A and FIG. 3B, the wavelength of a portion of the illumination beam LB allowed by the first electrochromic element 122 to pass through is different from the wavelength of a portion of the illumination beam LB allowed by the second electrochromic element 124 to pass through. The allowable wavelength may be modulated by adjusting the voltages of the first electrochromic element 122 and the second electrochromic element 124 to change the degree of light transmission, so as to modulate to the desired filtering color, but the disclosure is not limited thereto. In addition, the operation times (that is, the times in the reduction states) of the first electrochromic element 122 and the second electrochromic element 124 do not overlap, and the electrochromic materials of the first electrochromic element 122 and the second electrochromic element 124 are different, but the disclosure is not limited thereto.

In this way, the projection device 100 of the embodiment may sequentially modulate the wavelength range of the illumination beam LB to provide the color beams CB by using the electrochromic module 120, and the color beams are transmitted to the light valve 130, so that the narrow color space mode and the wide color space mode may be switched without an additional optical filter.

Figure 5:
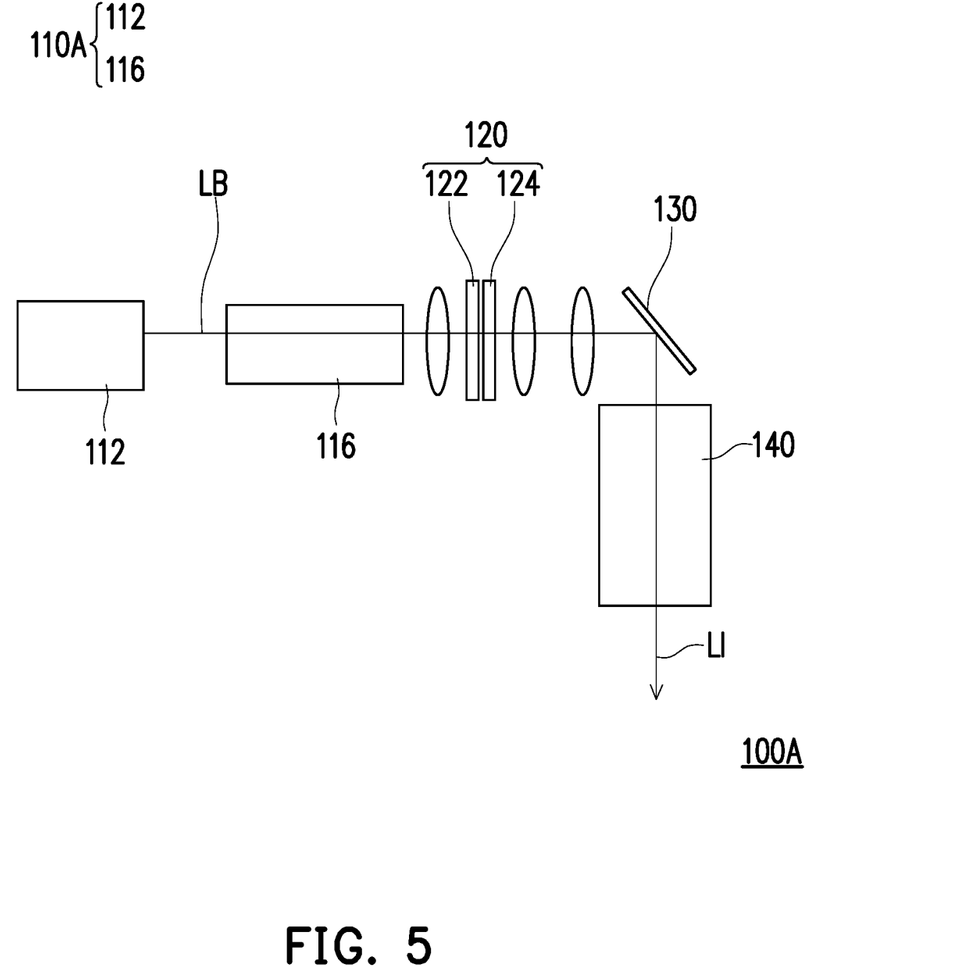
FIG. 5 is a schematic diagram of a projection device according to another embodiment of the disclosure.
Figure 6:
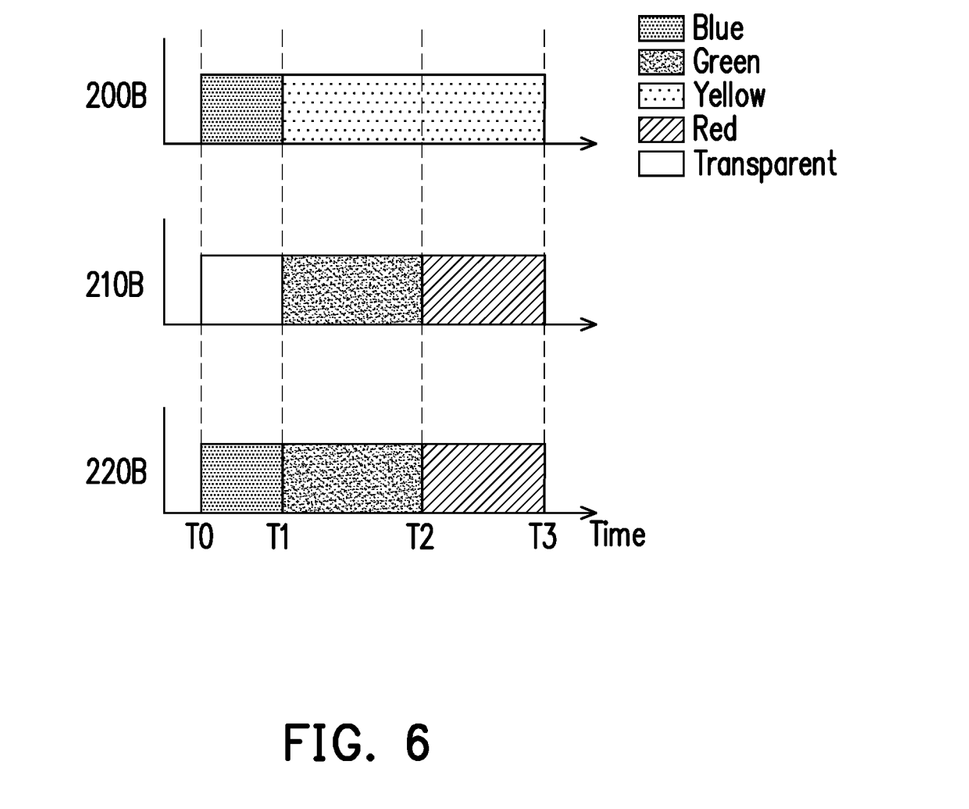
FIG. 6 is a schematic diagram of light source colors of the projection device of FIG. 5 in different time sequences.

FIG. 5 is a schematic diagram of a projection device according to another embodiment of the disclosure. FIG. 6 is a schematic diagram of light source colors of the projection device of FIG. 5 in different time sequences. Please refer to FIG. 5 and FIG. 6 at the same time. A projection device 100A of the embodiment shown in FIG. 5 is similar to the projection device 100 shown in FIG. 2. The difference between the two is that in the embodiment, an illumination light source 110A shown in FIG. 5 omits the filter element 114 shown in FIG. 2, and the illumination beam LB is filtered by using the electrochromic module 120. In FIG. 6, a graph 200B represents the colors of the illumination beams LB provided by the illumination light source 110A according to the time sequence. In the time sequence from the time T0 to the time T3, the illumination light source 110A sequentially provides blue and yellow illumination beams LB. A graph 210B represents the colors of the electrochromic module 120 that may allow the color beams to pass through. A graph 220B represents the colors of the color beams CB after passing through the electrochromic module 120 (or the colors of the color beams CB transmitted to the light valve 130). The yellow illumination beam LB may be, for example, excitation light converted by a wavelength conversion element (not shown in the figure).

In detail, in the time sequence from the time T0 to the time T1, the illumination light source 110A provides the blue illumination beam, and the electrochromic module 120 is modulated to be transparent and colorless. Specifically, the first electrochromic element 122 and the second electrochromic element 124 are both modulated to switch to the transparent state via the control element 170 (shown in FIG. 1), and the electrochromic module 120 receives the blue illumination beam and provide the blue color beam CB which has the same wavelength range of the blue illumination beam. Therefore, in the time sequence from the time T0 to the time T1, the light valve 130 receives the blue color beam CB.

In the time sequence from the time T1 to the time T2, the illumination light source 110A provides the yellow illumination beam converted by the wavelength conversion element (not shown in the figure), and the electrochromic module 120 is modulated to green. Specifically, during the time sequence from the time T1 to the time T2, the first electrochromic element 122 is modulated to switch to a state that only allows green color portion of the yellow illumination beam to pass through via the control element 170 (shown in FIG. 1) to provide the green color beam CB, and the second electrochromic element 124 is configured to maintain the transparent state, so as to allow the green color beam transmitted from the first electrochromic element 122 to pass through. The yellow illumination beam may be filtered into the green color beam by the electrochromic module 120. The light valve 130 receives the green color beam CB.

In the time sequence from the time T2 to the time T3, the illumination light source 110A provides the yellow illumination beam converted by the wavelength conversion element (not shown in the figure), and the electrochromic module 120 is modulated to red. Specifically, in the time sequence from the time T2 to the time T3, the first electrochromic element 122 is modulated to switch to the transparent state via the control element 170 (shown in FIG. 1) to allow the yellow illumination beam to pass through, and the second electrochromic element 124 is modulated to switch to a state that only allows red color portion of the yellow illumination beam to pass through via the control element 170 to provide the red color beam CB, so the yellow illumination beam may be filtered by the electrochromic module 120 into the red color beam. The light valve 130 receives the red color beam CB.

In other words, the same as the embodiment of FIG. 3A and FIG. 3B, the wavelength of a portion of the illumination beam LB allowed by the first electrochromic element 122 to pass through is different from the wavelength of a portion of the illumination beam LB allowed by the second electrochromic element 124 to pass through. The allowable wavelength range may be modulated by adjusting the voltages of the first electrochromic element 122 and the second electrochromic element 124 to change the degree of light transmission, so as to modulate to the desired filtering color, but the disclosure is not limited thereto. In addition, the operation times (that is, the times in the reduction states) of the first electrochromic element 122 and the second electrochromic element 124 do not overlap, and the electrochromic materials of the first electrochromic element 122 and the second electrochromic element 124 are different, but the disclosure is not limited thereto.

In this way, the projection device 100A of the embodiment may sequentially modulate the wavelength range of the illumination beam LB by using the electrochromic module 120 before entering the light valve 130, so that the illumination light source 110A may omit the configuration of a filter element and reduce the use of a rotating element to reduce the heat energy of the illumination light source 110A and reduce the noise generated by the projection device 100A.

Figure 7:
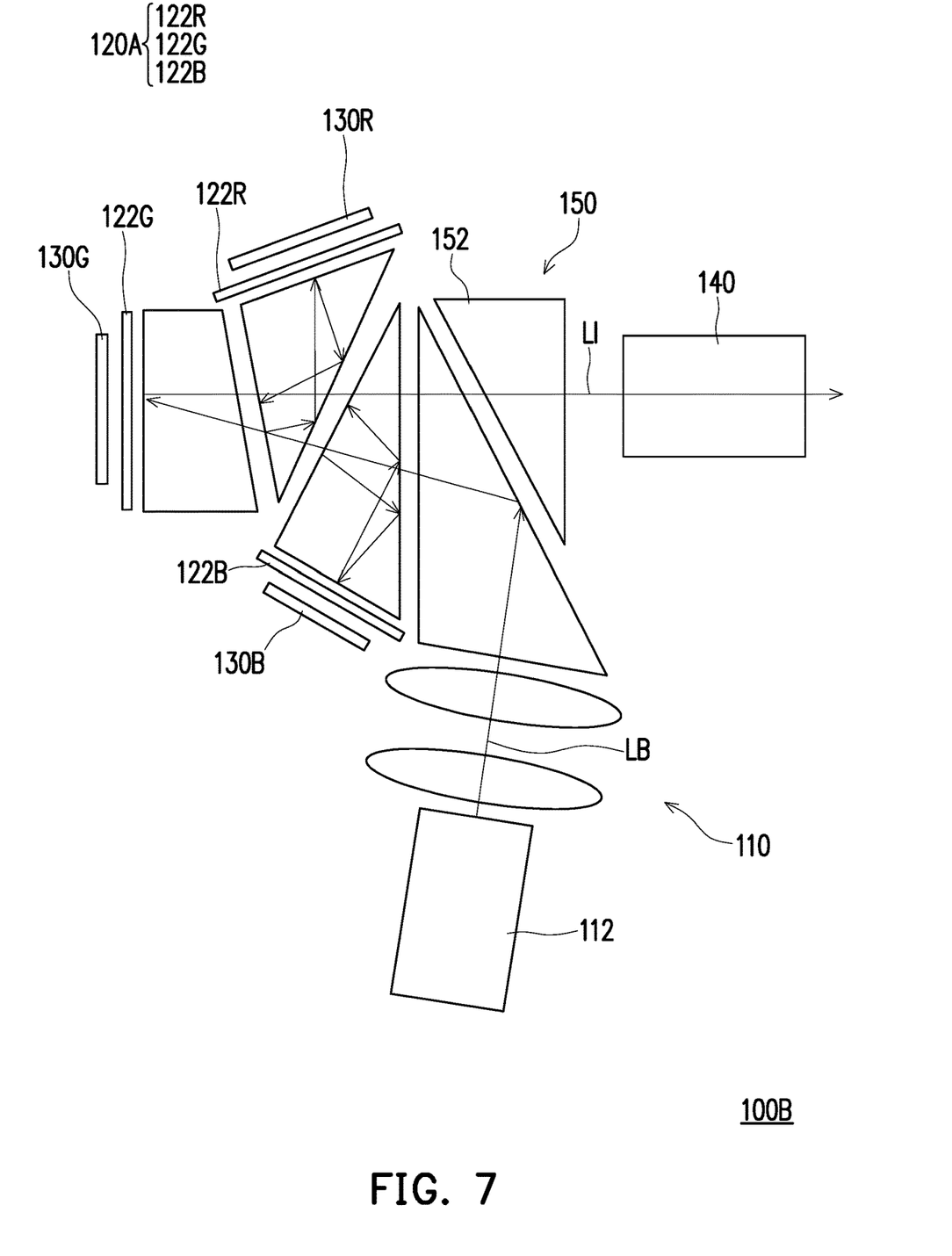
FIG. 7 is a schematic diagram of a projection device according to another embodiment of the disclosure.

FIG. 7 is a schematic diagram of a projection device according to another embodiment of the disclosure. Please refer to FIG. 7. A projection device 100B of the embodiment is similar to the projection device 100 shown in FIG. 2. The difference between the two is that in the embodiment, the projection device 100B further includes a light splitting/combining module 150, which is disposed between the illumination light source 110 and an electrochromic module 120A, and is located on the transmission path of the illumination beam LB. In the embodiment, the electrochromic module 120A includes three electrochromic elements 122R, 122G, and 122B, and there are also three light valves 130R, 130G, and 130B. In the embodiment, the light splitting/combining module 150 includes, for example, multiple optical prisms 152, and the light valves 130R, 130G, and 130B are, for example, reflective light valves, but the disclosure is not limited thereto.

The electrochromic element 122R is configured corresponding to the light valve 130R and is configured to receive the illumination beam and provide the red color beam, the electrochromic element 122G is configured corresponding to the light valve 130G and is configured to receive the illumination beam and provide the green color beam, and the electrochromic element 122B is configured corresponding to the light valve 130B and is configured to receive the illumination beam and provide the blue color beam. In addition, the light splitting/combining module 150 respectively guides the illumination beams LB with different wavelengths to the different electrochromic elements 122R, 122G, and 122B. In other words, the wavelengths of portions of the illumination beams LB allowed by the electrochromic elements 122R, 122G, and 122B to pass through are all different. The operation times of the electrochromic elements 122R, 122G, and 122B may overlap, but the disclosure is not limited thereto. Therefore, in the embodiment, the degree of light transmission may be changed by controlling the voltages of the electrochromic elements 122R, 122G, and 122B to modulate to the desired filtering colors. In this way, different color space modes may be switched without changing the illumination light source 110.

In detail, for the materials of the electrochromic elements 122R, 122G, and 122B, different compounds, the same compound with different concentrations, or the same compound with different groups added may be used. In addition, the number of electrochromic elements corresponding to each of the light valves 130R, 130G, and 130B of the projection device 100B of the embodiment may be more than two. The degree of light transmission may be changed by adjusting the voltage of each electrochromic element to superimpose the ideal color of each illumination beam LB.

Figure 8:
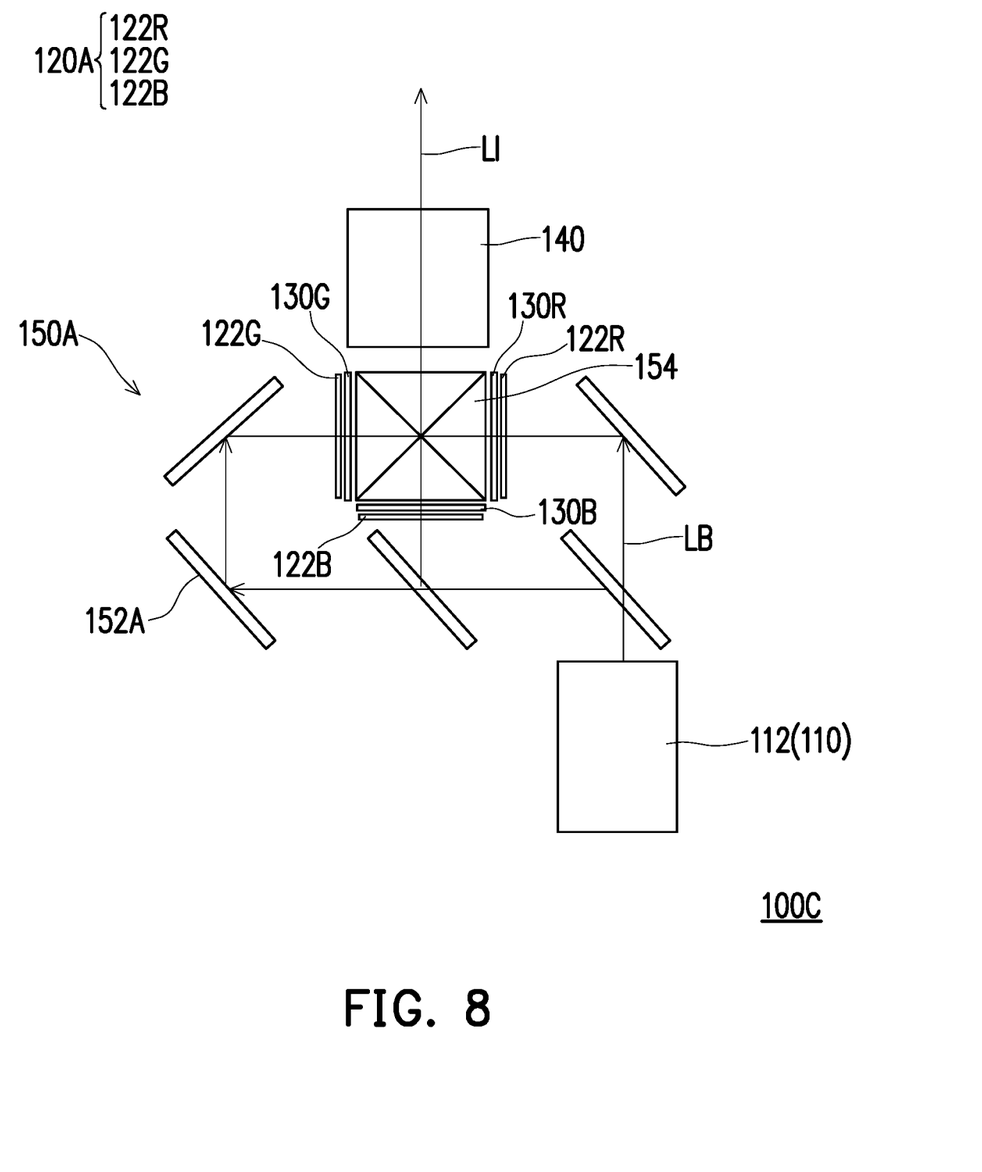
FIG. 8 is a schematic diagram of a projection device according to another embodiment of the disclosure.

FIG. 8 is a schematic diagram of a projection device according to another embodiment of the disclosure. Please refer to FIG. 8. A projection device 100C of the embodiment is similar to the projection device 100B shown in FIG. 7. The difference between the two is that in the embodiment, a light splitting/combining module 150A includes multiple light splitting/combining elements 152A, such as mirrors or light splitters, and the light valves 130R, 130G, and 130B are, for example, transmissive light valves, but the disclosure is not limited thereto.

The electrochromic element 122R is configured corresponding to the light valve 130R and is configured to receive the illumination beam and provide the red color beam, the electrochromic element 122G is configured corresponding to the light valve 130G and is configured to receive the illumination beam and provide the green color beam, and the electrochromic element 122B is configured corresponding to the light valve 130B and is configured to receive the illumination beam and provide the blue color beam. In addition, the light splitting/combining module 150A respectively guides the illumination beam LB with different wavelengths to the different electrochromic elements 122R, 122G, and 122B. In other words, the wavelengths of portions of the illumination beam LB allowed by the electrochromic elements 122R, 122G, and 122B to pass through are all different. Therefore, in the embodiment, the degree of light transmission may be changed by controlling the voltages of the electrochromic elements 122R, 122G, and 122B to modulate to the desired filtering colors. In this way, different color space modes may be switched without changing the illumination light source 110. For the detailed materials, numbers, and operation times of the electrochromic elements of the embodiment, sufficiently teaching may be obtained from the description of FIG. 7, so there will be no repetition.

Figure 9:
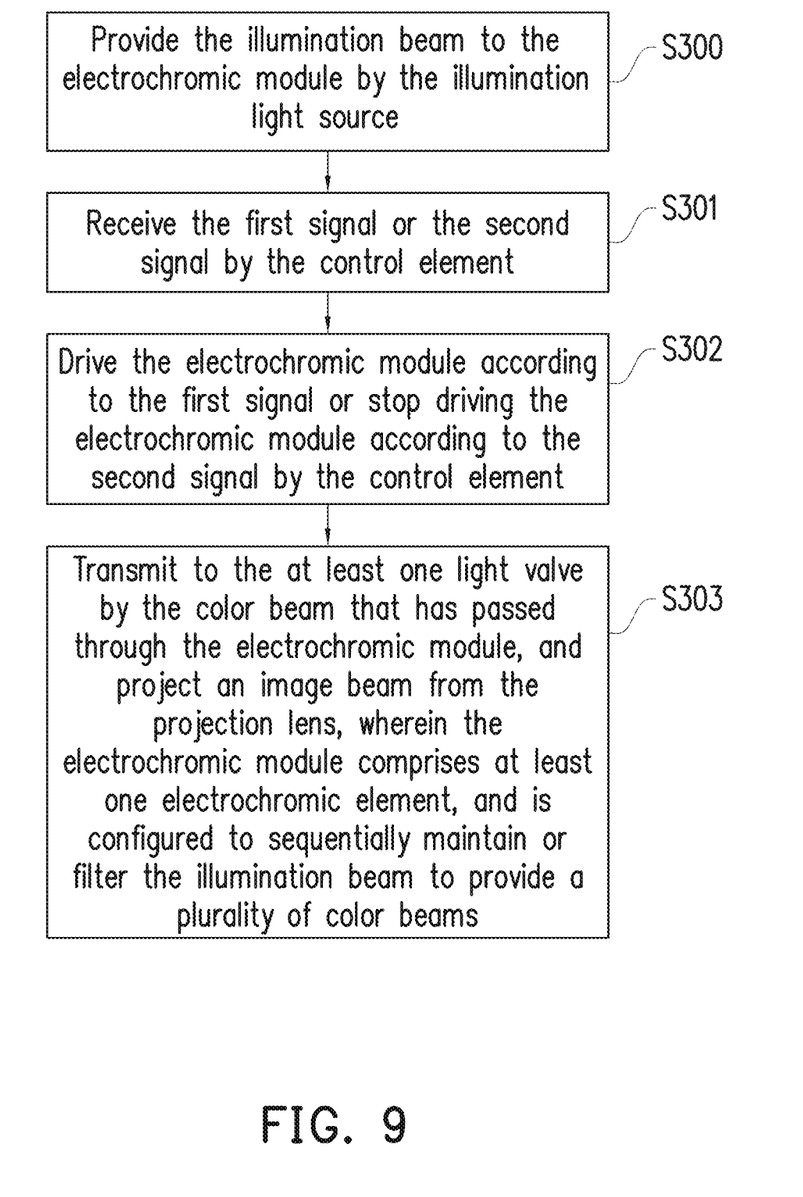
FIG. 9 is a flowchart of steps of a use method of a projection device according to an embodiment of the disclosure.

FIG. 9 is a flowchart of steps of a use method of a projection device according to an embodiment of the disclosure. Please refer to FIG. 1, FIG. 2, and FIG. 9. The flowchart of the steps of the use method of the projection device shown in FIG. 9 may be applied to at least the projection device 100 shown in FIG. 2, so the following paragraphs are exemplified by the projection device 100 shown in FIG. 2. In the embodiment, firstly, Step S300 is executed. The illumination light source 110 provides the illumination beam LB to the electrochromic module 120. For example, in the embodiment, the illumination light source 110 sequentially provides the blue, green, yellow, and red illumination beam LB according to different time sequences, and the illumination beams LB are transmitted to the electrochromic module 120.

Then, Step S301 is executed. The control element 170 receives a first signal or a second signal. For example, in the embodiment, the first signal and the second signal are, for example, time signals, which respectively represent a first time sequence and a second time sequence. The control element 170 may have a built-in timing function, which loops when the projection device 100 is activated. Alternatively, the first signal and the second signal received by the control element 170 are provided by a processor, but the disclosure is not limited thereto.

Then, Step S302 is executed. The control element 170 drives the electrochromic module 120 according to the first signal or stops driving the electrochromic module 120 according to the second signal. For example, in the embodiment, the electrochromic module 120 is driven at the first time sequence to filter the wavelength of the illumination beam LB and provide a color beam, and the electrochromic module 120 is stopped driving at the second time sequence to allow the illumination beam to pass through while maintaining the original wavelength and provide another color beam. It is worth mentioning that the electrochromic module 120 may include at least one electrochromic element, and is configured to sequentially maintain or filter the illumination beam LB to provide the color beams with the different wavelength ranges the at least one electrochromic element. In more detail, in the embodiment, the control element 170 adjusts the voltage of at least one of the first electrochromic element 122 and the second electrochromic element 124 to allow the electrochromic material to form the reduction state.

According to an embodiment of the disclosure, Step 302 further includes the following steps. The control element 170 modulates the first electrochromic element 122 to the reduction state such as a state that only allows green color portion of the illumination beam to pass through according to the first signal. The control element 170 stops driving the second electrochromic element 124 according to the first signal. The second electrochromic element 124 is switched to the oxidation state, such as the transparent state. The control element 170 stops driving the first electrochromic element 122 according to the second signal. The first electrochromic element 122 is switched to the oxidation state, such as the transparent state. The control element 170 modulates the second electrochromic element 124 to the reduction state, such as a state that only allows red color portion of the illumination beam to pass through according to the second signal.

According to another embodiment of the disclosure, when the illumination light source 110 sequentially provides the high-brightness green illumination beam LB and the high-brightness red illumination beam LB, Step 302 further includes the following steps. The control element 170 modulates the first electrochromic element 122 to the reduction state such as a state that only allows the pure green color portion of the high-brightness green illumination beam LB to pass through according to the first signal. The first electrochromic element 122 filters the high-brightness green illumination beam into the pure green color beam. The control element 170 stops driving the second electrochromic element 124 according to the first signal. The second electrochromic element 124 is switched to the oxidation state, such as the transparent state. The control element 170 stops driving the first electrochromic element 122 according to the second signal. The first electrochromic element 122 is switched to the oxidation state, such as the transparent state. In addition, the control element 170 modulates the second electrochromic element 124 to the reduction state, such as a state that only allows the pure red color portion of the high-brightness red illumination beam LB to pass through according to the second signal to provide the pure red color beam. The second electrochromic element 124 filters the high-brightness red illumination beam into the pure red color beam.

Finally, Step S303 is executed. The color beams CB provided by the electrochromic module 120 are transmitted to the light valve 130, and the image beam LI is projected from the projection lens 140.

According to another embodiment of the disclosure, please refer to FIG. 7 to FIG. 9. The flowchart of the steps of the use method of the projection device shown in FIG. 9 may also be applied to the projection device 100B or 100C shown in FIG. 7 or FIG. 8, so the following paragraphs are exemplified by the projection devices 100B and 100C shown in FIG. 7 and FIG. 8. The use method in the embodiment is similar to the use method of the projection device 100 shown in FIG. 2. The difference between the two is that in the embodiment, Step S300 further includes the following step. The illumination beams with different wavelengths are guided to the different electrochromic elements 122R, 122G, and 122B by using the light splitting/combining modules 150 and 150A. For the detailed number of electrochromic elements, respective wavelengths of the beams to be filtered, respective driving states in different time sequences, and whether respective operation times overlap, sufficient teaching may be obtained from the description of FIG. 2 to FIG. 8, so there will be no repetition.

In summary, in the projection device and the use method thereof of the disclosure, the electrochromic module is disposed on the transmission path of the illumination beam, and the light valve is disposed on the transmission path of the color beams transmitted by the electrochromic module. Therefore, the projection device may sequentially modulate the wavelength range of the illumination beam to provide the color beams before entering the light valve by using the electrochromic module. In this way, different projection modes may be switched without changing the illumination light source to reduce the loss of light emitting intensity or the configuration of the filter element may be omitted to reduce the heat energy of the illumination light source and the noise of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
an illumination light source, configured to provide an illumination beam;
an electrochromic module, disposed on a transmission path of the illumination beam, wherein the electrochromic module comprises at least one electrochromic element, and is configured to sequentially maintain or filter the illumination beam to provide a plurality of color beams;
at least one light valve, disposed on the transmission path of the color beams transmitted by the electrochromic module, and is configured to convert each of the color beams into an image beam; and
a projection lens, disposed on a transmission path of the image beam, and is configured to project the image beam out of the projection device,
wherein the illumination light source is configured to sequentially provide the illumination beam with different wavelengths, the electrochromic module comprises a first electrochromic element and a second electrochromic element, and a color portion of the illumination beam allowed by the first electrochromic element to pass through is different from a color portion of the illumination beam allowed by the second electrochromic element to pass through.

2. The projection device according to claim 1, wherein operation times of the first electrochromic element and the second electrochromic element do not overlap.

3. The projection device according to claim 1, wherein the first electrochromic element is configured to filter a yellow illumination beam into a green color beam and allow the green color beam to pass through, and the second electrochromic element is configured to filter the yellow illumination beam into a red color beam and allow the red color beam to pass through, wherein the illumination beam provided by the illumination light source comprises at least one of the yellow illumination beam, a green illumination beam and a red illumination beam.

4. The projection device according to claim 1, wherein the first electrochromic element is configured to filter a high-brightness green illumination beam into a green color beam and allow the green color beam to pass through, and the second electrochromic element is configured to filter a high-brightness red illumination beam into a red color beam and allow the red color beam to pass through, wherein the illumination beam provided by the illumination light source comprises at least one of the high-brightness green illumination beam and the high-brightness red illumination beam.

5. The projection device according to claim 1, wherein electrochromic materials of the first electrochromic element and the second electrochromic element are different.

6. The projection device according to claim 1, further comprising a collimation lens element disposed between the illumination light source and the electrochromic module, wherein the electrochromic module is disposed on a path where the illumination beam is transmitted in a collimated manner.

7. A projection device, comprising:
an illumination light source, configured to provide an illumination beam;
an electrochromic module, disposed on a transmission path of the illumination beam, wherein the electrochromic module comprises at least one electrochromic element, and is configured to maintain or filter the illumination beam to a color beam;
at least one light valve, disposed on the transmission path of the color beam transmitted by the electrochromic module, and is configured to convert the color beam into an image beam;
a projection lens, disposed on a transmission path of the image beam, and is configured to project the image beam out of the projection device; and
a light splitting/combining module, disposed between the illumination light source and the electrochromic module, and located on the transmission path of the illumination beam, wherein the at least one light valve and the at least one electrochromic element are a plurality of light valves and a plurality of electrochromic elements, the plurality of electrochromic elements respectively correspond to the plurality of light valves, and the light splitting/combining module is configured to respectively guide the illumination beam with different wavelengths to the plurality of different electrochromic elements.

8. The projection device according to claim 7, wherein a color portion of the illumination beam allowed by each of the plurality of electrochromic elements to pass through is different.

9. The projection device according to claim 7, wherein the plurality of light valves are reflective light valves or transmissive light valves.

10. A use method of a projection device, wherein the projection device comprises an illumination light source, an electrochromic module, a control element, at least one light valve, and a projection lens, the electrochromic module comprises at least one electrochromic element, and is configured to sequentially maintain or filter the illumination beam to provide a plurality of color beams, wherein the electrochromic module comprises a first electrochromic element and a second electrochromic element, the use method of the projection device comprising:
sequentially providing an illumination beam with different wavelengths respectively to the electrochromic module by the illumination light source;
receiving a first signal or a second signal by the control element;
driving the electrochromic module according to the first signal or stopping driving the electrochromic module according to the second signal by the control element, wherein the control element adjusts a voltage of at least one of the first electrochromic element and the second electrochromic element, and a color portion of the illumination beam allowed by the first electrochromic element to pass through is different from a color portion of the illumination beam allowed by the second electrochromic element to pass through; and
each of the color beams that has passed through the electrochromic module transmitting to the at least one light valve to be converted into an image beam, and projecting the image beam from the projection lens.

11. The use method of the projection device according to claim 10, wherein operation times of the first electrochromic element and the second electrochromic element do not overlap.

12. The use method of the projection device according to claim 10, further comprising:
adjusting the first electrochromic element to only allow a green color portion of the illumination beam to pass through and stopping driving the second electrochromic element in a first time sequence; and
adjusting the second electrochromic element to only allow a red color portion of the illumination beam to pass through and stopping driving the first electrochromic element in a second time sequence, wherein the illumination beam provided by the illumination light source comprises at least one of a yellow illumination beam, a green illumination beam and a red illumination beam.

13. The use method of the projection device according to claim 10, further comprising:
filtering a high-brightness green illumination beam into a green color beam and only allowing the green color beam to pass through by the first electrochromic element and stopping driving the second electrochromic element in a first time sequence; and
filtering a high-brightness red illumination beam into a red color beam and only allowing the red color beam to pass through by the second electrochromic element and stopping driving the first electrochromic element in a second time sequence, wherein the illumination beam provided by the illumination light source comprises at least one of the high-brightness green illumination beam and the high-brightness red illumination beam.

14. The use method of the projection device according to claim 10, wherein electrochromic materials of the first electrochromic element and the second electrochromic element are different.

15. The use method of the projection device according to claim 10, wherein the projection device further comprises a collimation lens element disposed between the illumination light source and the electrochromic module, and the electrochromic module is disposed on a path where the illumination beam is transmitted in a collimated manner.

16. A use method of the projection device, wherein the projection device comprises an illumination light source, an electrochromic module, a control element, a light splitting/combining module, at least one light valve, and a projection lens, the illumination light source is configured to provide an illumination beam, the light splitting/combining module is disposed on a transmission path of the illumination beam, the at least one light valve and the at least one electrochromic element are a plurality of light valves and a plurality of electrochromic elements, and the plurality of electrochromic elements respectively correspond to the plurality of light valves, the use method of the projection device comprising:
providing the illumination beam to the electrochromic module by the illumination light source;
receiving a first signal or a second signal by the control element;
driving the electrochromic module according to the first signal or stopping driving the electrochromic module according to the second signal by the control element;
guiding the illumination beam with different wavelengths to the plurality of different electrochromic elements by the light splitting/combining module;

providing a plurality of color beams respectively generated from the plurality of different electrochromic elements to the plurality of light valves;

converting each of the plurality of color beams into an image beam; and projecting the image beam from the projection lens.

17. The use method of the projection device according to claim 16, wherein a color portion of the illumination beam allowed by each of the plurality of electrochromic elements to pass through is different.

18. The use method of the projection device according to claim 16, wherein the plurality of light valves are reflective light valves or transmissive light valves.

* * * * *